United States Patent
Huang

(10) Patent No.: US 10,372,660 B2
(45) Date of Patent: Aug. 6, 2019

(54) EXTENSIBLE HOST CONTROLLER AND AN OPERATION METHOD THEREOF

(71) Applicant: Etron Technology, Inc., Hsinchu (TW)

(72) Inventor: Chih-Hung Huang, Taipei (TW)

(73) Assignee: eEver Technology, Inc., Taipei (TW)

( * ) Notice: Subject to any disclaimer, the term of this patent is extended or adjusted under 35 U.S.C. 154(b) by 260 days.

(21) Appl. No.: 15/259,066

(22) Filed: Sep. 8, 2016

(65) Prior Publication Data

US 2018/0067891 A1 Mar. 8, 2018

(51) Int. Cl.
*G06F 13/38* (2006.01)
*G06F 13/42* (2006.01)
*G06F 13/40* (2006.01)
*G06F 11/30* (2006.01)
*G06F 13/36* (2006.01)

(52) U.S. Cl.
CPC ........ *G06F 13/4282* (2013.01); *G06F 13/387* (2013.01); *G06F 13/4022* (2013.01); *G06F 11/3051* (2013.01); *G06F 13/36* (2013.01)

(58) Field of Classification Search
CPC ............ G06F 13/4022; G06F 13/4282; G06F 13/362; G06F 13/4068; G06F 13/4286; G06F 13/387; G06F 13/36; G06F 11/3051
See application file for complete search history.

(56) References Cited

U.S. PATENT DOCUMENTS

| | | | | |
|---|---|---|---|---|
| 2013/0145052 | A1* | 6/2013 | Aiken | G06F 9/4411 710/9 |
| 2013/0275640 | A1* | 10/2013 | Wang | G06F 13/36 710/300 |
| 2016/0179648 | A1* | 6/2016 | Srivastava | G06F 11/3051 710/16 |
| 2017/0286343 | A1* | 10/2017 | Rozic | G06F 13/385 |

* cited by examiner

*Primary Examiner* — Ernest Unelus
(74) *Attorney, Agent, or Firm* — Winston Hsu

(57) ABSTRACT

An extensible host controller (xHC) applied to a host includes universal serial bus (USB) module, a control circuit, an xHC interface circuit, a peripheral component interconnect express (PCIE) bus. The USB module includes a USB interface circuit and a predetermined interface circuit. The PCIE bus supports a USB mode and a predetermined data transmission mode. When a USB device is connected to the USB module, the control circuit issues first requests to the USB device to let the host utilize the USB mode and the USB interface circuit to communicate with the USB device; and when a USB host is connected to the USB module, the control circuit responds to second requests issued from the USB host to let the host utilize the predetermined data transmission mode and the predetermined interface circuit to communicate with the USB host.

8 Claims, 7 Drawing Sheets

EXTENSIBLE HOST CONTROLLER AND AN OPERATION METHOD THEREOF

BACKGROUND OF THE INVENTION

1. Field of the Invention

The present invention relates to an extensible host controller and an operation method thereof, and particularly to an extensible host controller and an operation method thereof that can utilize a debug capability unit of the extensible host controller to respond requests issued from a universal serial bus (USB) host to execute data transmission between the USB host and the extensible host controller when the USB host is connected to the extensible host controller.

2. Description of the Prior Art

The universal serial bus (USB) technique is an industry standard developed in mid-1990s that defines an external expansion bus which makes computer peripherals facilitate to connect to a host (e.g. a personal computer). Because the USB technique utilizes a master/slave architecture, a USB host controller of the host acts as a master role to send requests to a USB device (that is, a computer peripheral), and the USB device acts as a slave role to respond the requests from the host. The above mentioned master/slave roles are asymmetric and irreversible in a standard USB environment.

It is impossible to directly communicate between two hosts under the master/slave architecture except using an intermediate bridge device with both side slave interfaces. However, the intermediate bridge device is more expensive than an ordinary USB transmission line, and data transmission performance between the two hosts is limited due to indirect data transmission of the intermediate bridge device. Therefore, the intermediate bridge device is not proper to act as a communication Role between the two hosts.

SUMMARY OF THE INVENTION

An embodiment of the present invention provides an extensible host controller (xHC), wherein the extensible host controller is applied to a host. The extensible host controller includes universal serial bus (USB) module, a control circuit, an xHC interface circuit, a peripheral component interconnect express (PCIE) bus. The USB module includes a USB interface circuit and a predetermined interface circuit. The xHC interface circuit is coupled to the USB interface circuit. The PCIE bus is coupled to the xHC interface circuit and the control circuit, wherein the PCIE bus supports a USB mode and a predetermined data transmission mode. When a USB device is connected to the USB module, the control circuit issues first requests to the USB device to let the host utilize the USB mode and the USB interface circuit to communicate with the USB device; and when a USB host is connected to the USB module, the control circuit responds to second requests issued from the USB host to let the host utilize the predetermined data transmission mode and the predetermined interface circuit to communicate with the USB host.

An embodiment of the present invention provides an operation method of an extensible host controller, wherein the extensible host controller is applied to a host and includes a USB module, a control circuit, and a PCIE bus, and the PCIE bus supports a USB mode and a predetermined data transmission mode. The operation method includes when a USB device is connected to the USB module, the control circuit issuing first requests to the USB device to let the host utilize the USB mode and a USB interface circuit comprised in the USB module to communicate with the USB device; and when a USB host is connected to the USB module, the control circuit controlling a predetermined interface circuit comprised in the USB module to respond to second requests issued from the USB host to let the host utilize the predetermined data transmission mode and the predetermined interface circuit to communicate with the USB host.

The present invention provides an extensible host controller and an operation method thereof. Because the extensible host controller and the operation method can utilize a debug capability unit of the extensible host controller to respond requests issued from another USB host when the another USB host is connected to the extensible host controller, the extensible host controller and the operation method can directly utilize an ordinary USB transmission line to execute data transmission between the extensible host controller and the another USB host. Therefore, compared to the prior art, because the present invention can directly utilize the ordinary USB transmission line to execute data transmission between the extensible host controller and the another USB host, the present invention does not need an expensive intermediate bridge device to execute data transmission between the extensible host controller and the another USB host. In addition, data transmission performance of the present invention is better than the prior art due to direct data transmission between the extensible host controller and the another USB host.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
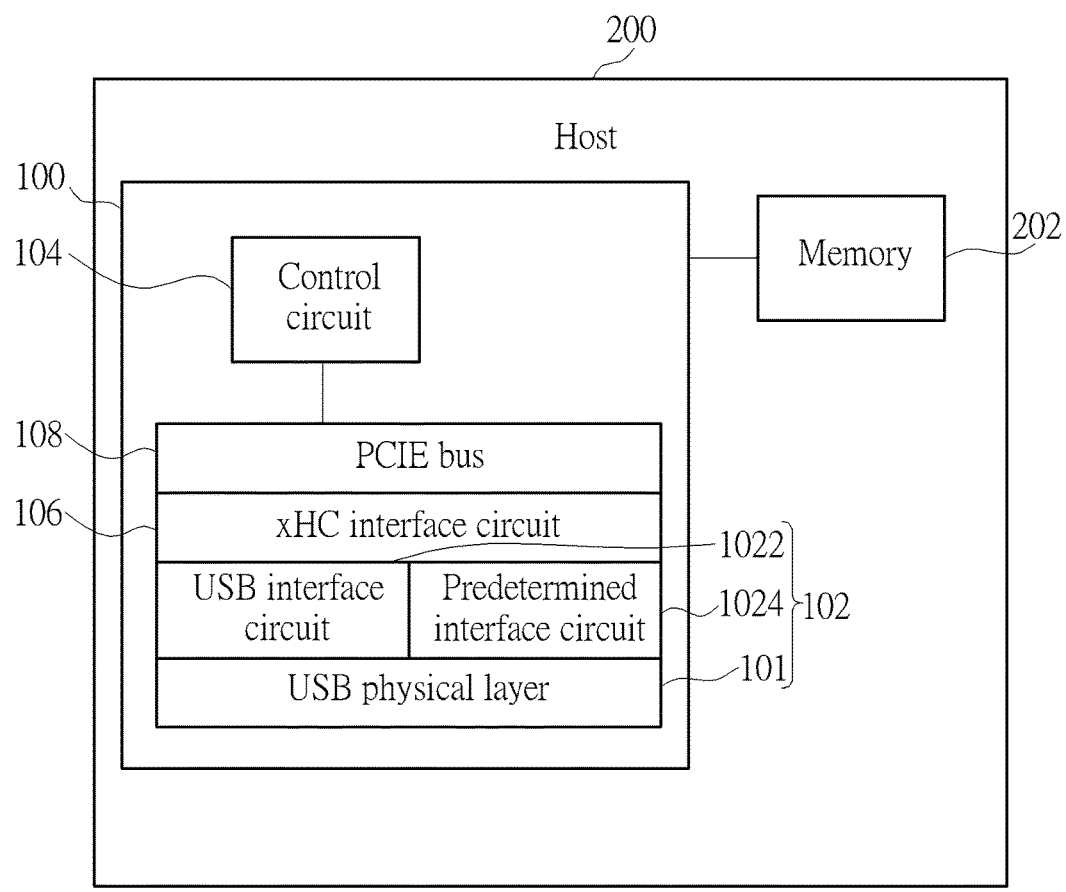
FIG. 1 is a diagram illustrating an extensible host controller according to a first embodiment of the present invention.

Please refer to FIG. 1. FIG. 1 is a diagram illustrating an extensible host controller (xHC) 100 according to a first embodiment of the present invention, wherein the extensible host controller 100 is applied to a host 200, and the extensible host controller 100 includes a universal serial bus (USB) module 102, a control circuit 104, an xHC interface circuit 106, and a peripheral component interconnect express (PCIE) bus 108, wherein the USB module 102 includes a USB physical layer 101, a USB interface circuit 1022, and a predetermined interface circuit 1024, and the USB module 102 can support USB 1.0, USB 1.1, USB 2.0, USB 3.0, and USB 3.1 standard specifications. In one embodiment of the present invention, the predetermined interface circuit 1024 is a debug capability unit. As shown in FIG. 1, the USB interface circuit 1022 and the predetermined interface circuit 1024 are coupled to the xHC interface circuit 106. But, in another embodiment of the present invention, the xHC interface circuit 106 can be replaced with another predetermined interface, wherein the another predetermined interface needs to be able to support the USB interface circuit 1022 and the predetermined interface circuit 1024. As shown in FIG. 1, the PCIE bus 108 is coupled to the xHC interface circuit 106 and the control circuit 104, wherein the PCIE bus 108 can simultaneously support a USB mode and a predetermined data transmission mode, wherein the predetermined data transmission mode is a network mode.

Figure 2:
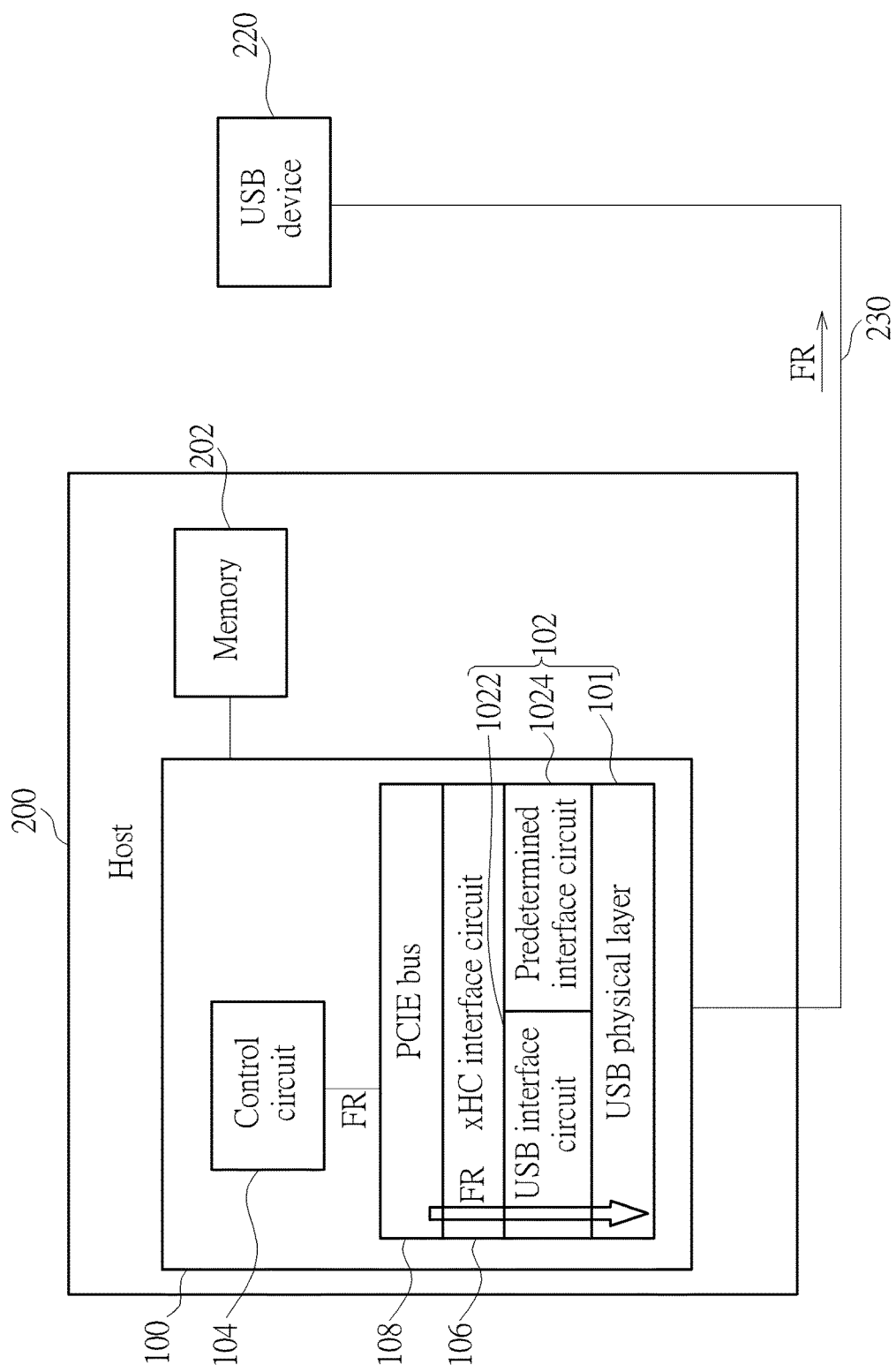
FIG. 2 is a diagram illustrating a USB device being connected to the host through the extensible host controller and an ordinary USB transmission line.

Please refer to FIG. 2. FIG. 2 is a diagram illustrating a USB device 220 being connected to the host 200 through the extensible host controller 100 and an ordinary USB transmission line 230, wherein the USB device 220 can be a USB storage device, a USB flash device, a USB personal computer camera, and so on. As shown in FIG. 2, when the USB device 220 is connected to the host 200 through the extensible host controller 100 and the ordinary USB transmission line 230, the control circuit 104 of the extensible host controller 100 can identify that the USB device 220 is a USB device, so the extensible host controller 100 can act as a master role and the USB device 220 can act as a slave role, and a USB device driver built in the control circuit 104 can ask an xHCI driver built in the control circuit 104 to issue first requests FR to the USB device 220. That is to say, the first requests FR can be transmitted to the USB device 220 through the PCIE bus 108, the xHC interface circuit 106, the USB interface circuit 1022, and the USB physical layer 101. After the USB device 220 receives the first requests FR, the USB device 220 can respond to the first requests FR. Therefore, after the USB device 220 responds to the first requests FR, the host 200 can utilize the USB mode to communicate with the USB device 220. For example, the USB device 220 can transmit data to a memory 202 of the host 200 through the ordinary USB transmission line 230, the USB physical layer 101, the USB interface circuit 1022, the xHC interface circuit 106, and the PCIE bus 108. In addition, the host 200 can also transmit data stored in the memory 202 to the USB device 220 through the ordinary USB transmission line 230, the USB physical layer 101, the USB interface circuit 1022, the xHC interface circuit 106, and the PCIE bus 108.

Figure 3:
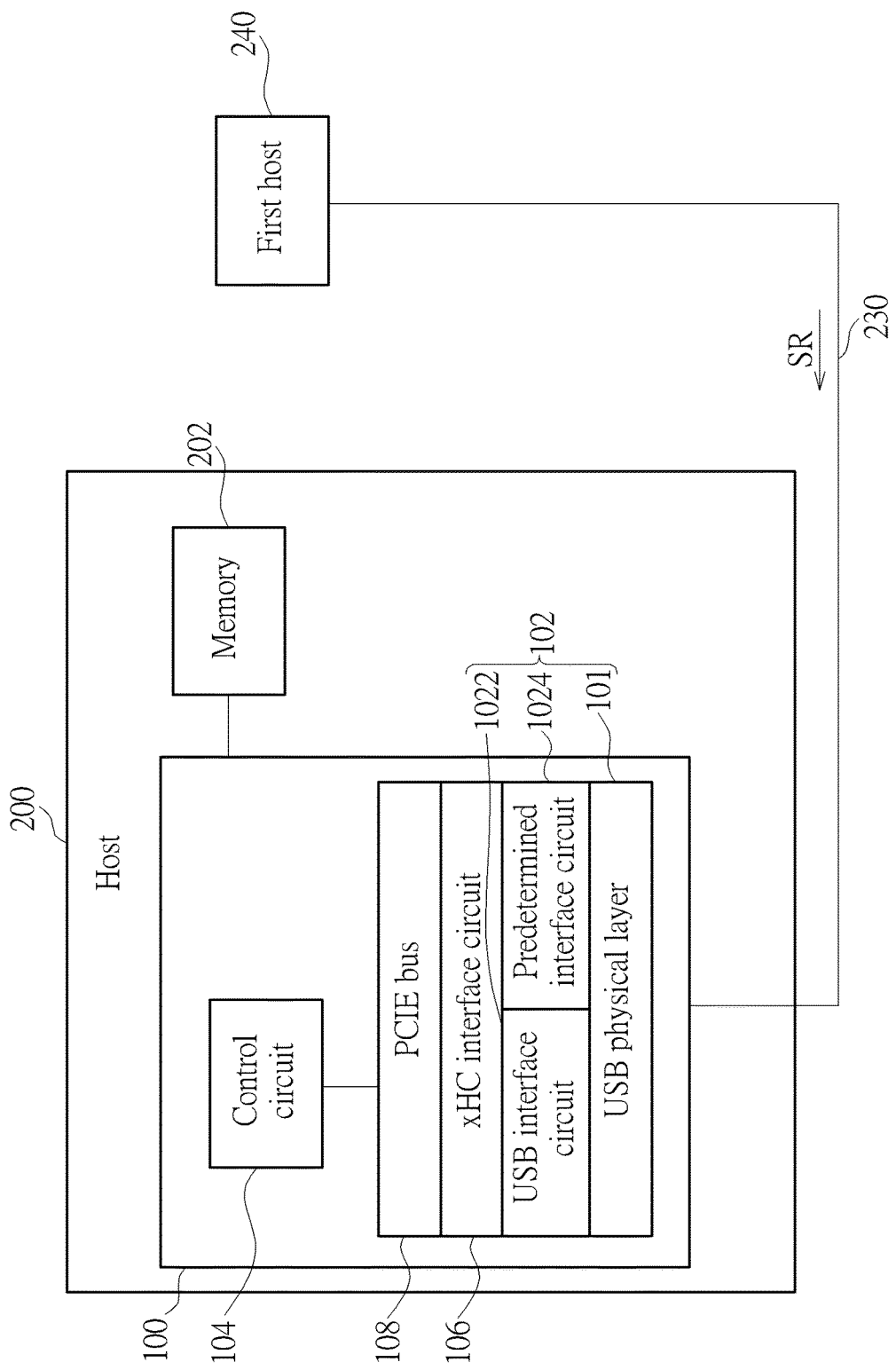
FIG. 3 is a diagram illustrating a first host being connected to the host through the extensible host controller and the ordinary USB transmission line.

Please refer to FIG. 3. FIG. 3 is a diagram illustrating a first host 240 being connected to the host 200 through the extensible host controller 100 and the ordinary USB transmission line 230. As shown in FIG. 3, when the first host 240 is connected to the host 200 through the extensible host controller 100 and the ordinary USB transmission line 230, the control circuit 104 of the extensible host controller 100 can identify the first host 240 is a USB host. According to a USB 3.x standard specification (USB 3.0 standard specification or other USB standard specification higher than USB 3.0), because the extensible host controller 100 has the debug capability unit, when the first host 240 issues second requests SR to the extensible host controller 100, a predetermined driver built in the control circuit 104 can drive the predetermined interface circuit 1024 to respond the second requests SR. Therefore, after the predetermined interface circuit 1024 responds to the second requests SR, the host 200 can utilize the predetermined data transmission mode to communicate with the first host 240. For example, when the first host 240 is connected to the host 200, the control circuit 104 can utilize a virtual network adapter (e.g. a 5 Gb Ethernet network driver built in the control circuit 104) to simulate an Ethernet environment, so the first host 240 can utilize a network package way to transmit data to the memory 202 of the host 200 through the ordinary USB transmission line 230, the USB physical layer 101, the predetermined interface circuit 1024, the xHC interface circuit 106, and the PCIE bus 108. In addition, the host 200 can also transmit data stored in the memory 202 to the first host 240 through the ordinary USB transmission line 230, the USB physical layer 101, the predetermined interface circuit 1024, the xHC interface circuit 106, and the PCIE bus 108. In addition, when the first host 240 is connected to the host 200, the present invention is not limited to the first host 240 utilizing the network package way to communicate with the host 200. That is to say, when the first host 240 is connected to the host 200, the control circuit 104 can utilize another driver to build a data transmission environment to let the first host 240 utilize another data transmission way to communicate with the host 200.

Figure 4:
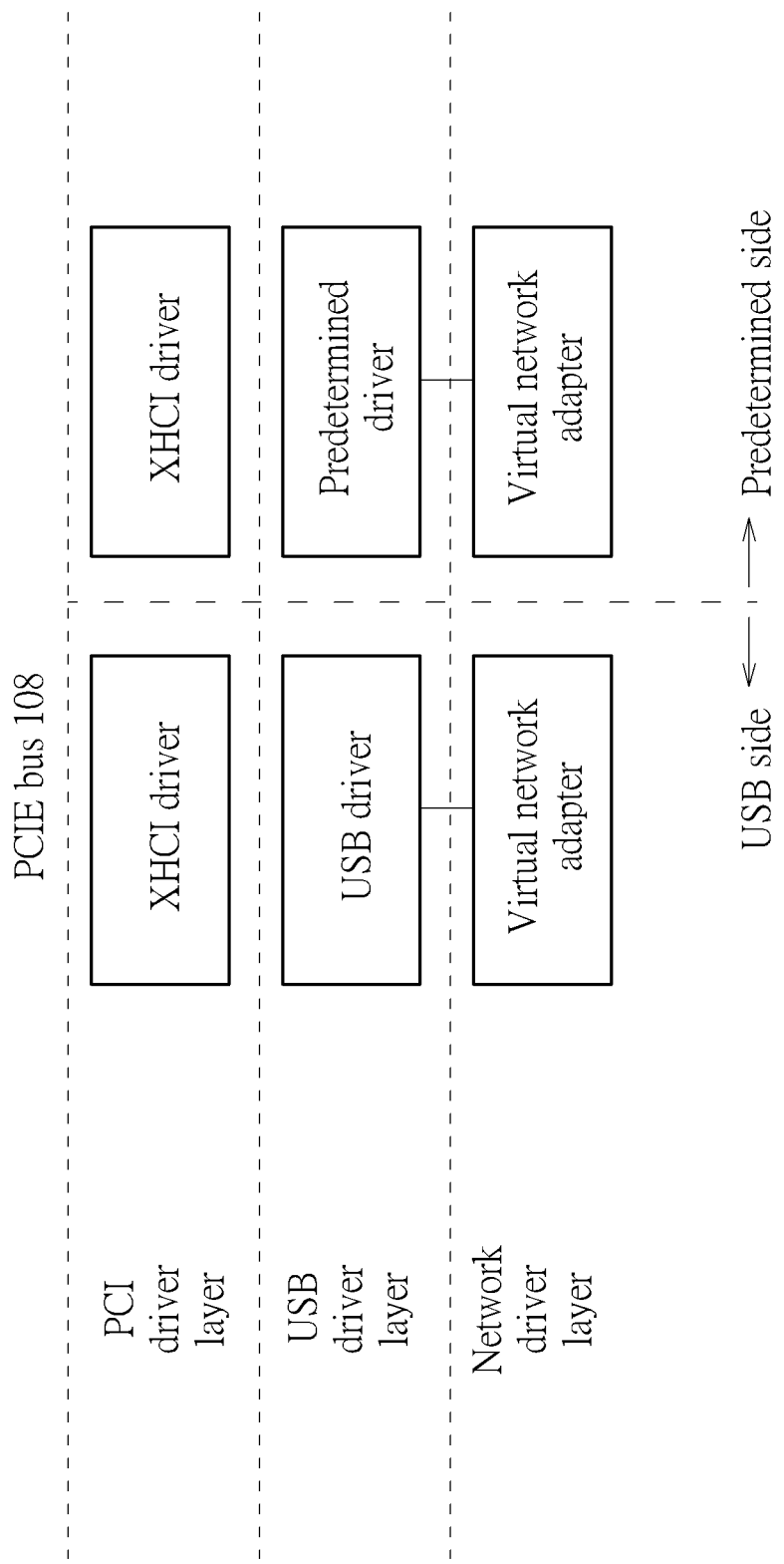
FIG. 4 is a diagram illustrating a data structure built in the control circuit corresponding to the USB device driver, the xHCI driver, the predetermined driver, and the virtual network adapter applied to the extensible host controller.

Please refer to FIG. 4. FIG. 4 is a diagram illustrating a data structure built in the control circuit 104 corresponding to the USB device driver, the xHCI driver, the predetermined driver, and the virtual network adapter applied to the extensible host controller 100. As shown in FIG. 4, the data structure includes a USB side and a predetermined side. When the USB device 220 is connected to the host 200, the control circuit 104 utilizes the USB side to drive corresponding hardware (e.g. the xHC interface circuit 106, the USB interface circuit 1022, and the USB physical layer 101) of the extensible host controller 100; and when the first host 240 is connected to the host 200, the control circuit 104 utilizes the predetermined side to drive corresponding hardware (e.g. the xHC interface circuit 106, the predetermined interface circuit 1024 (the debug capability unit), and the USB physical layer 101) of the extensible host controller 100.

Figure 5:
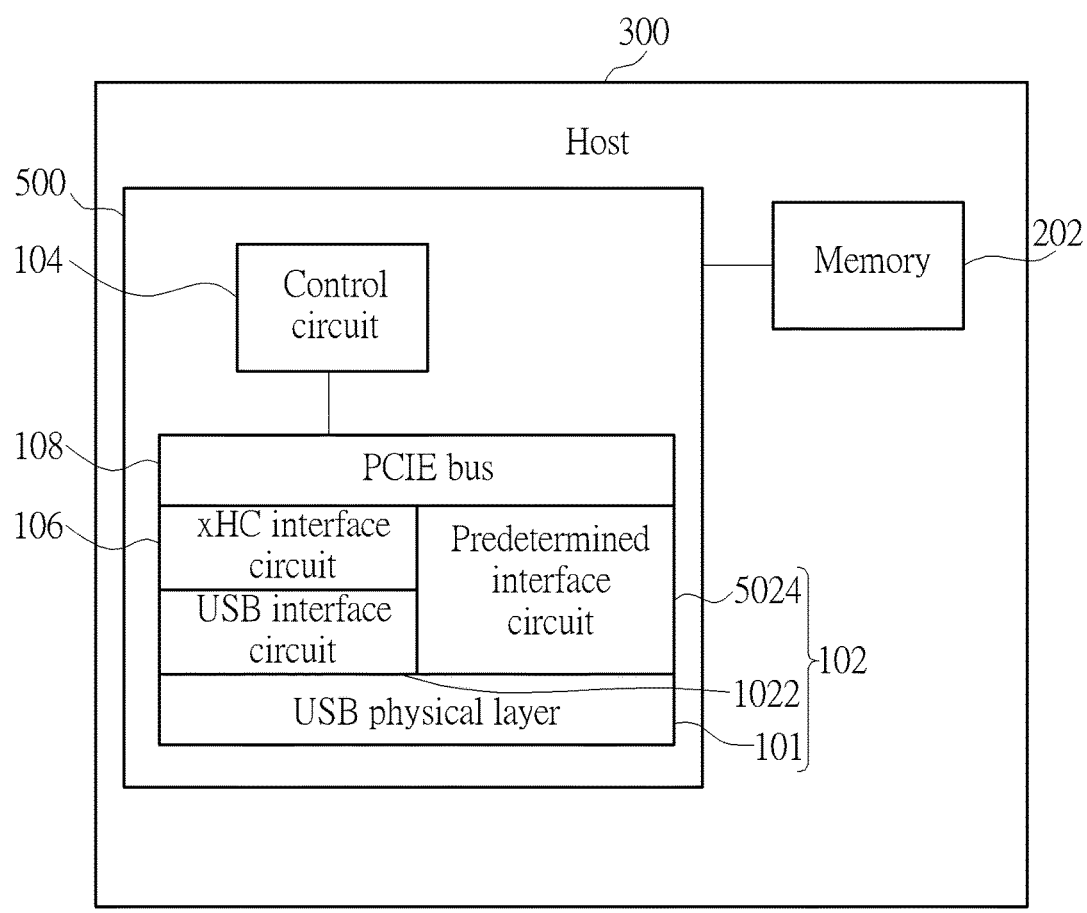
FIG. 5 is a diagram illustrating an extensible host controller according to a second embodiment of the present invention.

Please refer to FIG. 5. FIG. 5 is a diagram illustrating an extensible host controller 500 according to a second embodiment of the present invention, wherein the extensible host controller 500 is applied to a host 300. As shown in FIG. 5, a difference between the extensible host controller 500 and the extensible host controller 100 is that a predetermined interface circuit 5024 of the extensible host controller 500 is directly coupled to the PCIE bus 108. Therefore, when a second host is connected to the host 300 through the extensible host controller 500 and the ordinary USB transmission line 230, the second host can utilize the network package way to transmit data to the memory 202 of the host 300 through the ordinary USB transmission line 230, the USB physical layer 101, the predetermined interface circuit 5024, and the PCIE bus 108. In addition, the host 300 can also transmit data stored in the memory 202 to the second host through the ordinary USB transmission line 230, the USB physical layer 101, the predetermined interface circuit 5024, and the PCIE bus 108. In addition, subsequent operational principles of the extensible host controller 500 are the same as those of the extensible host controller 100, so further description thereof is omitted for simplicity.

Figure 6:
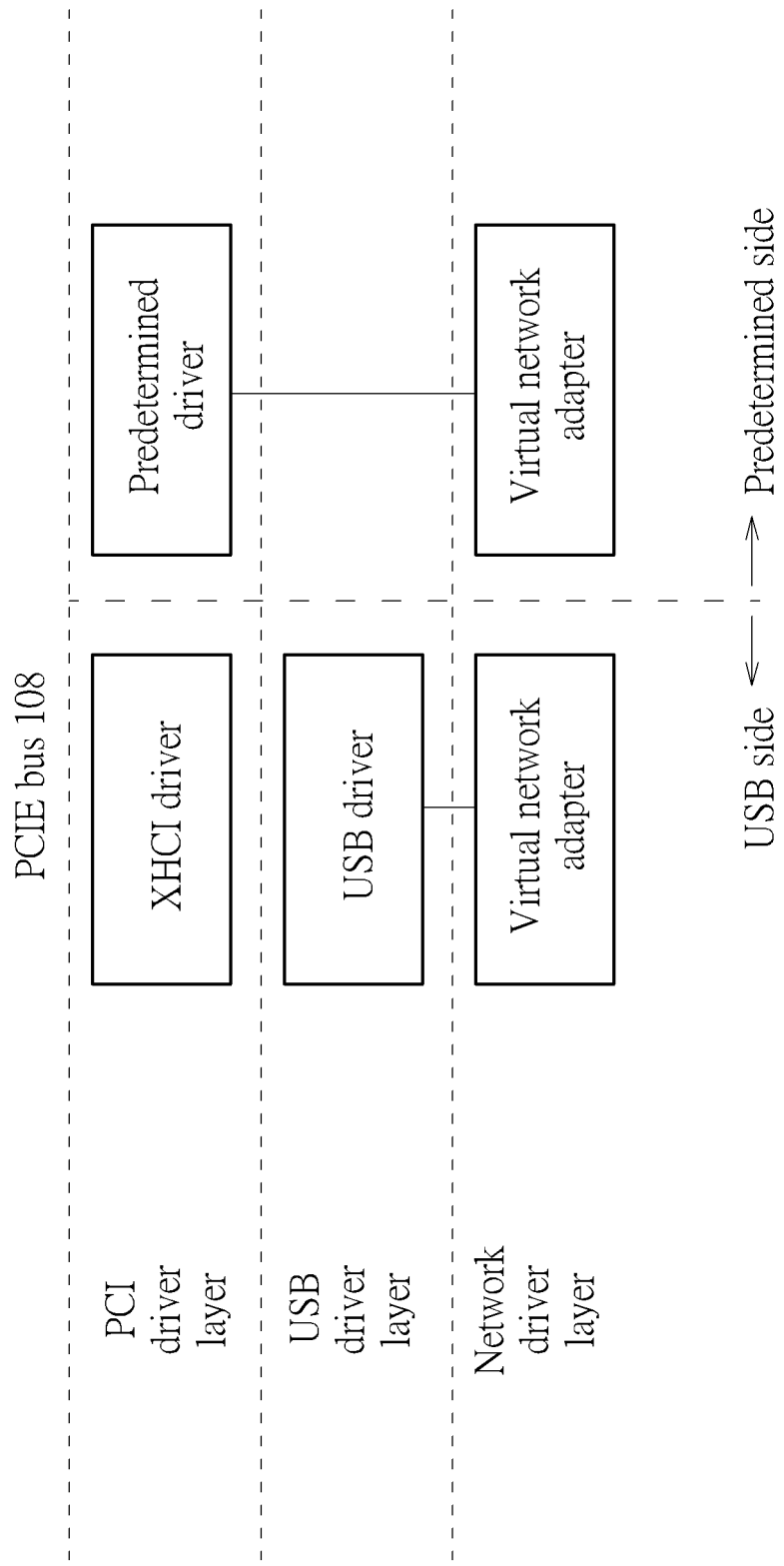
FIG. 6 is a diagram illustrating a data structure built in the control circuit corresponding to the USB device driver, the xHCI driver, the predetermined driver, and the virtual network adapter applied to the extensible host controller.

Please refer to FIG. 6. FIG. 6 is a diagram illustrating a data structure built in the control circuit 104 corresponding to the USB device driver, the xHCI driver, the predetermined driver, and the virtual network adapter applied to the extensible host controller 500. As shown in FIG. 6, the data structure also includes a USB side and a predetermined side. When a USB device is connected to the host 300, the control circuit 104 utilizes the USB side in FIG. 6 to drive corresponding hardware (e.g. the xHC interface circuit 106, the USB interface circuit 1022, and the USB physical layer 101) of the extensible host controller 500; and when the second host is connected to the host 300, the control circuit 104 utilizes the predetermined side in FIG. 6 to drive corresponding hardware (e.g. the predetermined interface circuit 5024 (the debug capability unit), and the USB physical layer 101) of the extensible host controller 500.

Figure 7:
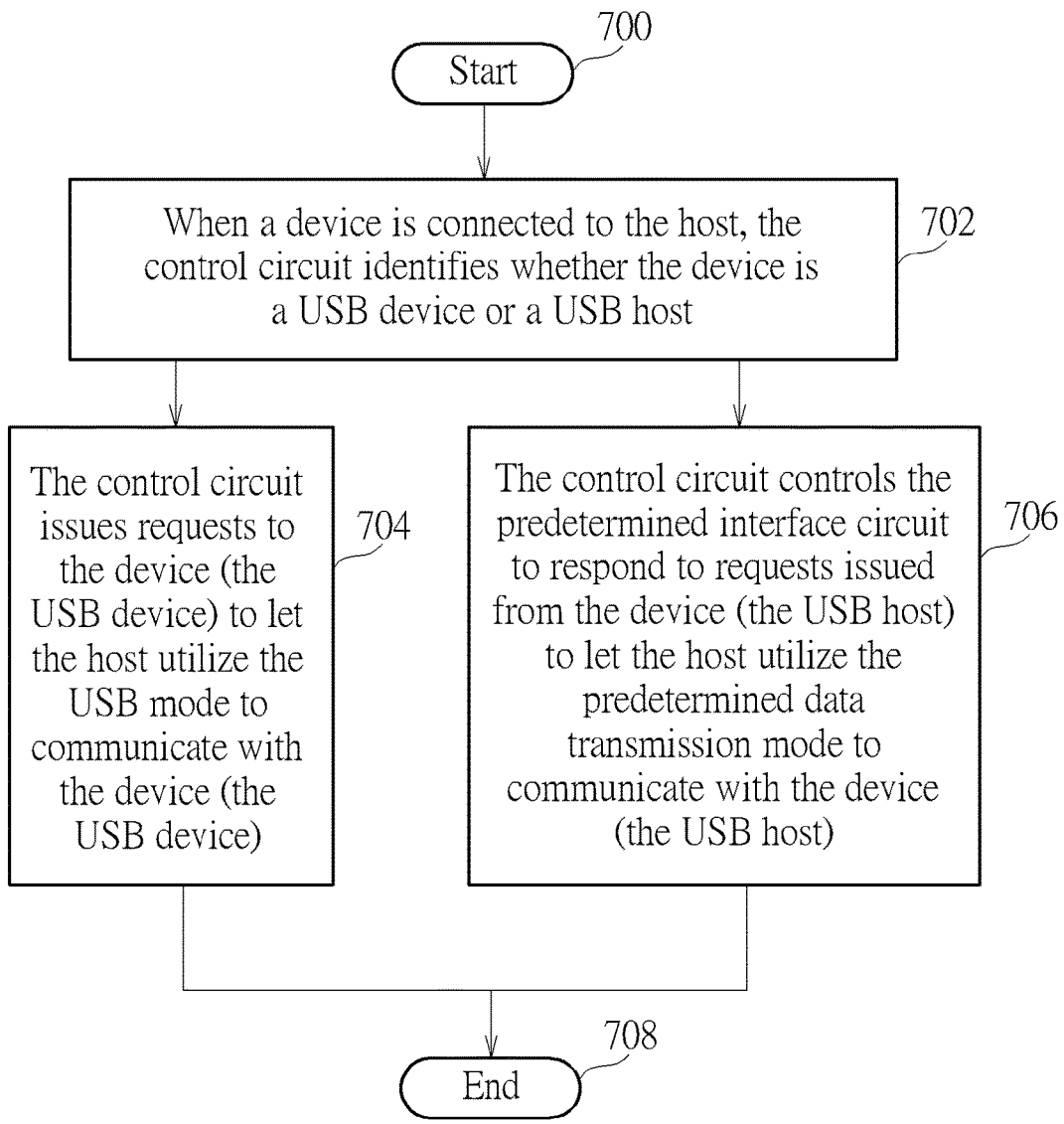
FIG. 7 is a flowchart illustrating an operation method of an extensible host controller according to a third embodiment of the present invention.

Please refer to FIGS. 1-3, 7. FIG. 7 is a flowchart illustrating an operation method of an extensible host controller according to a third embodiment of the present invention. The operation method in FIG. 7 is illustrated using the extensible host controller 100 in FIG. 1. Detailed steps are as follows:

Step 700: Start.

Step 702: When a device is connected to the host 200, the control circuit 104 identifies whether the device is a USB device or a USB host; if the control circuit 104 identifies the device as the USB device, go to Step 704; and if the control circuit 104 identifies the device as the USB host, go to Step 706.

Step 704: The control circuit 104 issues requests to the device (the USB device) to let the host 200 utilize the USB mode to communicate with the device (the USB device), go to Step 708.

Step 706: The control circuit 104 controls the predetermined interface circuit 1024 to respond to requests issued from the device (the USB host) to let the host 200 utilize the predetermined data transmission mode to communicate with the device (the USB host), go to Step 708.

Step 708: End.

In Step 704, as shown in FIG. 2, when the device (e.g. the USB device 220) is connected to the host 200 through the extensible host controller 100 and the ordinary USB transmission line 230, the extensible host controller 100 can act as a master role and the USB device 220 can act as a slave role, and the USB device driver built in the control circuit 104 can ask the xHCI driver built in the control circuit 104 to issue the first requests FR to the USB device 220. After the USB device 220 receives the first requests FR, the USB device 220 can respond to the first requests FR. Therefore, after the USB device 220 responds to the first requests FR, the host 200 can utilize the USB mode to communicate with the USB device 220. For example, the USB device 220 can transmit data to the memory 202 of the host 200 through the ordinary USB transmission line 230, the USB physical layer 101, the USB interface circuit 1022, the xHC interface circuit 106, and the PCIE bus 108. In addition, the host 200 can also transmit data stored in the memory 202 to the USB device 220 through the ordinary USB transmission line 230, the USB physical layer 101, the USB interface circuit 1022, the xHC interface circuit 106, and the PCIE bus 108.

In Step 706, as shown in FIG. 3, when the device (e.g. the first host 240) is connected to the host 200 through the extensible host controller 100 and the ordinary USB transmission line 230, because the extensible host controller 100 has the debug capability unit, after the first host 240 issues second requests SR to the extensible host controller 100, the predetermined driver built in the control circuit 104 can drive the predetermined interface circuit 1024 to respond the second requests SR. Therefore, after the predetermined interface circuit 1024 responds to the second requests SR, the host 200 can utilize the predetermined data transmission mode to communicate with the first host 240. For example, when the first host 240 is connected to the host 200, the control circuit 104 can utilize the virtual network adapter (e.g. the 5 Gb Ethernet network driver built in the control circuit 104) to simulate Ethernet environment, so the first host 240 can utilize a network package way to transmit data to the memory 202 of the host 200 through the ordinary USB transmission line 230, the USB physical layer 101, the predetermined interface circuit 1024, the xHC interface circuit 106, and the PCIE bus 108. In addition, the host 200 can also transmit data stored in the memory 202 to the first host 240 through the ordinary USB transmission line 230, the USB physical layer 101, the predetermined interface circuit 1024, the xHC interface circuit 106, and the PCIE bus 108. In addition, when the first host 240 is connected to the host 200, the present invention is not limited to the first host 240 utilizing the network package way to communicate with the host 200. That is to say, when the first host 240 is connected to the host 200, the control circuit 104 can utilize another driver to build a data transmission environment to let the first host 240 utilize another data transmission way to communicate with the host 200.

To sum up, because the extensible host controller and the operation method thereof can utilize the predetermined interface circuit (the debug capability unit) to respond requests issued from another USB host when the another USB host is connected to the extensible host controller, the extensible host controller and the operation method can directly utilize an ordinary USB transmission line to execute data transmission between the extensible host controller and the another USB host. Therefore, compared to the prior art, because the present invention can directly utilize the ordinary USB transmission line to execute data transmission between the extensible host controller and the another USB host, the present invention does not need an expensive intermediate bridge device to execute data transmission between the extensible host controller and the another USB host. In addition, data transmission performance of the present invention is better than the prior art due to direct data transmission between the extensible host controller and the another USB host.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An extensible host controller (xHC), wherein the extensible host controller is applied to a host, the extensible host controller comprising:
   a universal serial bus (USB) module, wherein the USB module comprises a USB interface circuit, a debug capability unit and a USB physical layer, wherein the debug capability unit has a debug function and a network transmission function, and the USB interface circuit and the debug capability unit are connected to the USB physical layer;
   a control circuit;
   an xHC interface circuit coupled to the USB interface circuit; and a peripheral component interconnect express (PCIE) bus coupled to the xHC interface circuit and the control circuit, wherein the PCIE bus supports a USB mode and a predetermined data transmission mode;

wherein when a USB device is connected to the USB module, the control circuit makes the host utilize the USB mode and the USB interface circuit to communicate with the USB device; and when a USB host is connected to the USB module, the control circuit makes the host utilize the predetermined data transmission mode and the debug capability unit to communicate with the USB host, rather than utilizing the USB mode and the USB interface circuit to communicate with the USB host.

2. The extensible host controller of claim 1, wherein the predetermined data transmission mode is a network mode.

3. The extensible host controller of claim 1, wherein the USB module supports USB 1.0, USB 1.1, USB 2.0, USB 3.0, and USB 3.1 standard specifications.

4. The extensible host controller of claim 1, wherein the debug capability unit is coupled to the xHC interface circuit.

5. The extensible host controller of claim 1, wherein the debug capability unit is directly coupled to the PCIE bus.

6. An operation method of an extensible host controller comprising:

when a USB device is connected to a USB module, a control circuit making a host utilize a USB mode and a USB interface circuit comprised in the USB module to communicate with the USB device; and when a USB host is connected to the USB module, the control circuit making the host utilize a predetermined data transmission mode and a debug capability unit to communicate with the USB host, rather than utilizing the USB mode and the USB interface circuit to communicate with the USB host, wherein the debug capability unit has a debug function and a network transmission function;

wherein the extensible host controller is applied to the host and comprises the USB module, the control circuit, and a PCIE bus, the PCIE bus supports the USB mode and the predetermined data transmission mode, and the USB interface circuit and the debug capability unit are connected to a USB physical layer comprised in the USB module.

7. The operation method of claim 6, wherein the predetermined data transmission mode is a network mode.

8. The operation method of claim 6, wherein the USB module supports USB 1.0, USB 1.1, USB 2.0, USB 3.0, and USB 3.1 standard specifications.

* * * * *